(12) United States Patent  
Lee (10) Patent No.: US 9,451,397 B1
(45) Date of Patent: Sep. 20, 2016

(54) DETECTING PROXIMITY USING WIFI HOTSPOTS

(71) Applicant: Square, Inc., San Francisco, CA (US)

(72) Inventor: Bob Lee, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/726,165

(22) Filed: May 29, 2015

Related U.S. Application Data (62) Division of application No. 13/802,290, filed on Mar. 13, 2013, now Pat. No. 9,055,400.

(60) Provisional application No. 61/736,439, filed on Dec. 12, 2012.

(51) Int. Cl.
   *H04W 24/00* (2009.01)
   *H04W 4/02* (2009.01)
   *H04W 64/00* (2009.01)
   *H04W 8/00* (2009.01)
   *H04W 84/12* (2009.01)

(52) U.S. Cl.
   CPC .............. *H04W 4/02* (2013.01); *H04W 8/005* (2013.01); *H04W 64/00* (2013.01); *H04W 84/12* (2013.01)

(58) Field of Classification Search
   CPC ..... H04W 4/02; H04W 64/00; H04W 8/005; H04W 84/12
   USPC .......... 455/456.3, 435.1, 456.1, 404.1, 414.1
   See application file for complete search history.

(56) References Cited

U.S. PATENT DOCUMENTS

| | | | |
|---|---|---|---|
| 7,403,762 B2 | 7/2008 | Morgan et al. | |
| 9,055,400 B1 | 6/2015 | Lee | |
| 2005/0048961 A1* | 3/2005 | Ribaudo | H04M 3/42348 455/419 |
| 2005/0266798 A1 | 12/2005 | Moloney et al. | |
| 2007/0030824 A1* | 2/2007 | Ribaudo | G01S 5/0018 370/328 |
| 2011/0063138 A1 | 3/2011 | Berkobin et al. | |
| 2012/0195295 A1* | 8/2012 | Elmaleh | H04W 4/023 370/338 |
| 2013/0157685 A1 | 6/2013 | Young | |
| 2014/0068719 A1* | 3/2014 | Kiukkonen | H04W 12/08 726/4 |
| 2015/0031388 A1 | 1/2015 | Chatterjee et al. | |

OTHER PUBLICATIONS

U.S. Appl. No. 13/801,340, of Lee, B., filed Mar. 13, 2013.
U.S. Appl. No. 14/803,850, of Lee, B., filed Jul. 20, 2015.
Restriction Requirement mailed Sep. 30, 2014, for U.S. Appl. No. 13/802,290, of Lee, B., filed Mar. 13, 2013.
Notice of Allowance mailed Feb. 6, 2015, for U.S. Appl. No. 13/802,290, of Lee, B., filed Mar. 13, 2013.
Notice of Allowance mailed Apr. 13, 2015, for U.S. Appl. No. 13/801,340, of Lee, B., filed Mar. 13, 2013.
Non Final Office Action mailed Oct. 1, 2015, for U.S. Appl. No. 14/803,850, of Lee, B., filed Jul. 20, 2015.

* cited by examiner

*Primary Examiner* — Khai M Nguyen
(74) *Attorney, Agent, or Firm* — Lee & Hayes, PLLC (57) ABSTRACT

A method of includes receiving hotspot identification data from the first device, where the identification data identifies a plurality of WiFi hotspots that are in proximity to the first device; determining that the second device is associated with the first device; sending the hotspot identification data to the second device, where the first device and second device are mobile devices; receiving an indication of proximity from the second device; and notifying the first device of the indication of proximity.

24 Claims, 5 Drawing Sheets

DETECTING PROXIMITY USING WIFI HOTSPOTS

CROSS REFERENCE TO RELATED APPLICATIONS

This application is a divisional of and claims priority to U.S. patent application Ser. No. 13/802,290, filed on Mar. 13, 2013, which is a non-provisional of and claims priority to U.S. Provisional Patent Application No. 61/736,439, filed on Dec. 12, 2012, the entire contents of which are hereby incorporated by reference.

TECHNICAL FIELD

This disclosure relates to detecting proximity using WiFi hotspots.

BACKGROUND

Mobile devices can determine proximity to each other based on location. Each device can obtain a current location. Generally, to obtain a current location, a mobile device can use data based on three sources: 1) WiFi hotspots, 2) cellular towers, or 3) a Global Positioning System (GPS). In particular, the mobile device sends data from any of the three sources to a server, and the server responds with location coordinates, e.g., longitude and latitude coordinates. A mobile device can compare its location to other devices' locations, e.g., by measuring distance between locations, to determine proximity. For example, if the measured distances are lower than a predetermined threshold, the devices can be determined to be in proximity to each other.

SUMMARY

This specification relates to determining proximity between mobile devices using WiFi hotspots. A first device identifies hotspots surrounding the first device. In some implementations, the first device hashes the identified hotspots into a hash value. The first device sends the hash value to a server system. The server system can send the hash value to a second device. The second device can compare the received hash value to a hashed value of WiFi hotspots that surround the second device. If the hash values are equivalent, the second device determines it is in proximity to the first device.

In one aspect, a method includes receiving hotspot identification data from the first device, where the identification data identifies a plurality of WiFi hotspots that are in proximity to the first device; determining that the second device is associated with the first device; sending the hotspot identification data to the second device, where the first device and second device are mobile devices; receiving an indication of proximity from the second device; and notifying the first device of the indication of proximity.

Implementations may include one or more of the following features. The hotspot identification data is a hash value of the MAC addresses and/or names of the plurality of WiFi hotspots. The hotspot identification data is a list of the MAC addresses and/or names of the plurality of WiFi hotspots. The notifying includes sending, to the first device, the indication of proximity of the second device and data associated with the second device. The data associated with the second device includes personal identifying information of a user of the second device. Receiving, from the first device, data indicating a payment transaction between the first device and the second device; and submitting the transaction to a financial service for authorization. The determining comprises determining the second device has given an indication of consent to interact with the first device. The first device is a customer device, and a second device is a merchant device, further comprising: prior to sending the hotspot identification data to the second device, determining the customer device has given an indication of consent to perform a cardless payment transaction with the merchant device.

In another aspect, a method of determining proximity between a first device and a second device, comprising: receiving first hotspot identification data from a server system, the first hotspot identification data identifying a first plurality of WiFi hotspots in proximity to the first device; identifying second hotspot identification data that indicates a second plurality of WiFi hotspots in proximity to the second device, where the first device and the second device are mobile devices; determining whether the first device and the second device are in proximity to each other based at least on a comparison between the first hotspot identification data and the second hotspot identification data; and if the first device and the second device are in proximity to each other, sending an indication of proximity to the server system.

Implementations may include one or more of the following. The first and second hotspot identification data are hash values of the first plurality of WiFi hotspots and second plurality of WiFi hotspots, respectively. The first and second hotspot identification data are lists of the MAC (media access control) addresses and/or names of the first plurality of WiFi hotspots and second plurality of WiFi hotspots, respectively. The identifying occurs periodically after an interval of time. The determining occurs when the second device detects one or more changes in the second plurality of WiFi hotspots. The first device and the second device are in proximity to each other if the hash values of the first plurality of WiFi hotspots and the second plurality of WiFi hotspots are equivalent. The first device is a merchant device, the second device is a customer device, and the server system is a cardless payment system.

Advantages may include one or more of the following. Proximity can be determined without determining locations, e.g., latitude and longitude, of a first mobile device and a second mobile device. When a system determines whether two devices are in proximity to each other, the identities of surrounding WiFi hotspots around the two devices remain private through use of hash values. Proximity determination can occur on a local mobile device instead of on an external system, reducing need for wireless communication and thereby saving battery on the local device.

In some implementations, the first device is a merchant device and the second device is a customer device. A merchant device can be provided with a list of nearby customer devices that have given an indication of consent to perform a transaction. By limiting transactions to customer devices that are in proximity to the merchant device, the merchant device can prevent unauthorized transactions with customer devices that are not in proximity to the merchant device. This enhances security for both the merchant and the customer. Also, if the merchant device is notified when the customer device is in proximity, the merchant can provide a personalized experience to the customer.

BRIEF DESCRIPTION OF THE DRAWINGS

Like reference numbers and designations in the various drawings indicate like elements.

DETAILED DESCRIPTION

Figure 1:
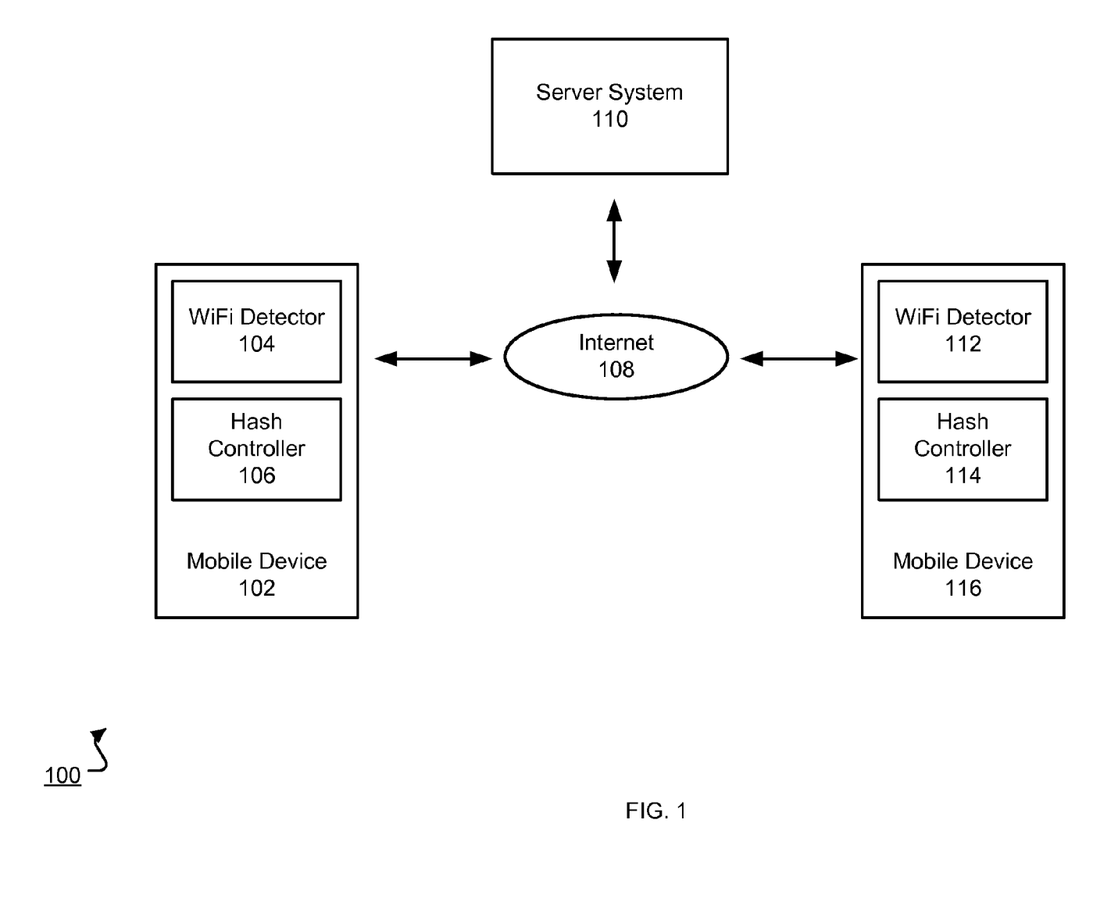
FIG. 1 is a schematic illustration of an example proximity detection system architecture.

FIG. 1 is a schematic illustration of an example proximity detection system architecture 100. A first mobile device 102 detects whether a second mobile device 116 is in proximity using a server system 110. Mobile devices 102, 116 communicate with the server system 110 over the Internet 108. The mobile devices 102, 116 can connect to the Internet 108 using a cellular data connection, e.g., 3G or 4G, or a wireless local area network connection, e.g., WiFi. Each mobile device 102, 116 includes a WiFi detector 104, 112 and a hash controller 106, 114.

The WiFi detectors 104, 112 identify WiFi hotspots (or "wireless access points (WAPs)") surrounding the respective mobile device. When identifying WiFi hotspots, the respective mobile device can receive from the hotspot a MAC address to connect to and a name of the WiFi hotspot. WiFi hotspots generally have a limited range. As a mobile device changes locations, a WiFi detector in the mobile device can identify new WiFi hotspots that are within range of the mobile device. In other words, the mobile device can detect when surrounding WiFi hotspots change.

The hash controllers 106, 114 generate and compare hash values. Hash values are generated through hash functions. A hash function maps data, e.g., lists of WiFi hotspots, to hash values. In some implementations, the hash values are represented as integers. In some other implementations, the hash values are represented as alphanumeric strings. For example, the hash function can receive a list of MAC addresses and/or names of WiFi hotspots and can generate a hash value from the list. The hash controllers 106, 114 also compare hash values. For example, mobile device 116 can receive a hash value from the server system 110. The mobile device 116 can determine whether the received hash value is equal to a generated hash value. In some implementations, generating and/or comparing hash values occur on the server system 110.

In some implementations, devices have different hash functions. For example, mobile device 102 can send a list of WiFi hotspots, i.e., a list of the MAC addresses and/or names of the hotspots detected by the first mobile device 102, to the server system 110. The server system 110 can identify an appropriate hash function from a list of hash functions for mobile device 116, e.g., based on a unique device identification of mobile device 116. The server system 110 can hash the list of WiFi hotspots from mobile device 102 using the appropriate hash function and send the hashed list to mobile device 116. Mobile device 116 can hash, e.g., using the same hash function used by the server system 110, surrounding WiFi hotspots and compare the hash to the received list to determine proximity, which will be described further below in reference to FIGS. 3 and 4.

Figure 2:
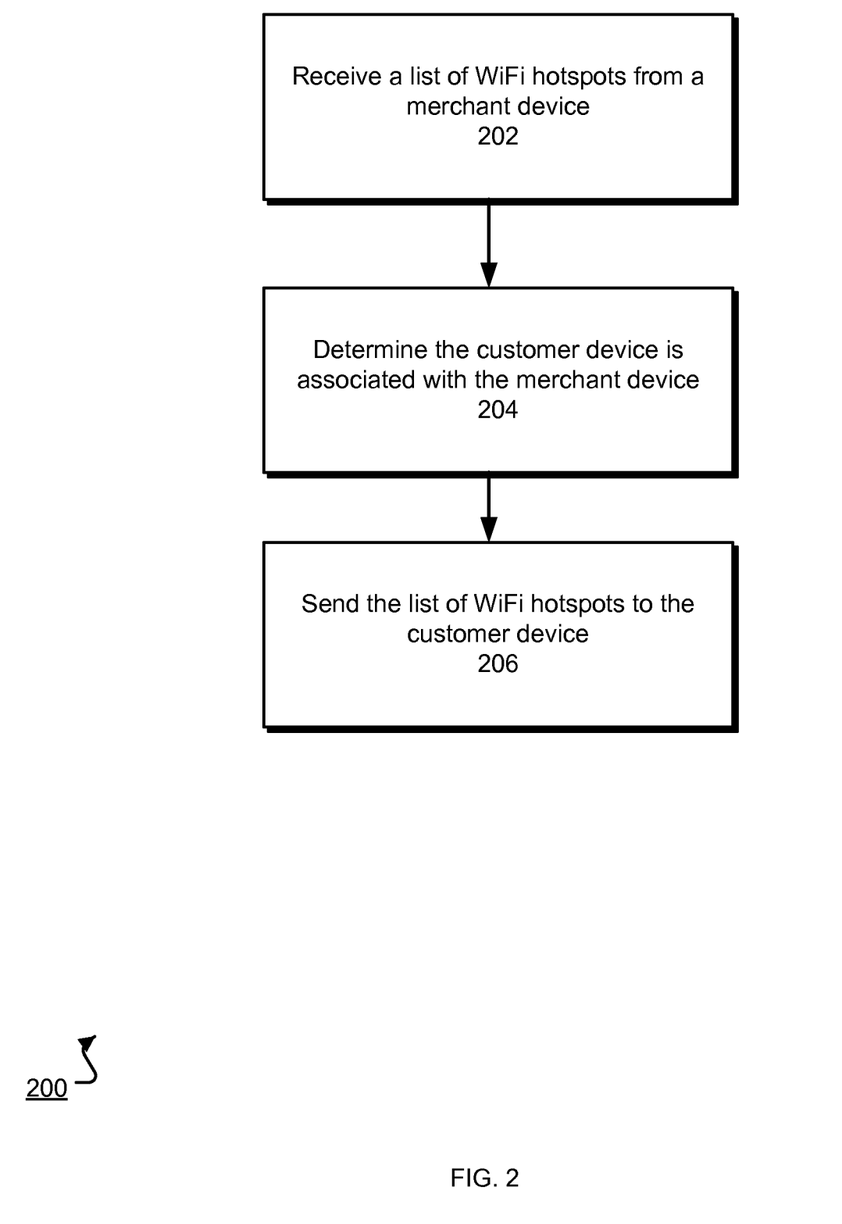
FIG. 2 is a diagram of an example flow chart of a server system processing WiFi hotspots to determine proximity between a first device and a second device.

FIG. 2 is a diagram of an example flow chart 200 of a server system processing WiFi hotspots to determine proximity between a first device and a second device. For simplicity, the first device is described as a merchant device, and the second device is described as a customer device. Other types of devices are possible, e.g., the first and second devices can both be personal user devices.

A merchant device identifies surrounding WiFi hotspots, e.g., using a WiFi detector. The merchant device creates a list of WiFi hotspots, e.g., where each item in the list is a name of a distinct WiFi hotspot. The merchant device can send the list of WiFi hotspots to a server system, e.g., the server system in reference to FIG. 1. In some implementations, the merchant device uses a hash function on the list of WiFi hotspots to create a hash value. The hash value, e.g., an alphanumeric string, represents the list of WiFi hotspots in an anonymous way. That is, generally, the list of WiFi hotspots cannot be reverse engineered from the hash value. The merchant device can send the hash value to the server system. The server system receives the list of WiFi hotspots from the merchant device (step 202).

The server system determines whether a customer device is associated with the merchant device (step 204). In some implementations, the two devices are associated if the customer device gives an indication of consent to interact with the merchant device. In some other implementations, the two devices are associated if the customer device has given an indication of consent to conduct a payment transaction with the merchant device. In particular, the consent allows the server system to notify the merchant device when the customer device is in proximity to the merchant device. The server system having an indication of proximity between the merchant device and the customer device can be a prerequisite to conducting a payment transaction. In alternative implementations, the indication of proximity is only one of a few prerequisites to conducting the payment transaction. For example, in addition to requiring an indication of proximity, the server system can ensure the customer device is within a predetermined distance from the merchant device, e.g., using geofencing technology, before conducting the payment transaction. In some implementations, the first and second devices are both personal user devices and the first user has simply authorized the second user to detect when the first user is present, e.g., to provide this information to a social networking application on the second user's mobile device.

In some implementations, the customer can conduct a cardless payment transaction with the merchant. The cardless payment transaction is described in US Patent Application (Ser. No. 61/563,022), filed on Nov. 22, 2011, entitled "Cardless Payment Transactions," which is incorporated by reference herein in its entirety. The customer device can give, to the server system, an indication of consent to conduct a cardless payment transaction with the merchant. The server system, e.g., acting as a cardless payment system, can determine the customer device is associated with the merchant device when the server system receives the indication of consent.

When the server system determines the customer device is associated with the merchant device, the server system sends the list of WiFi hotspots to the customer device (step 206). In some implementations, the server system sends the hash value of the list of WiFi hotspots to the customer device.

Figure 3:
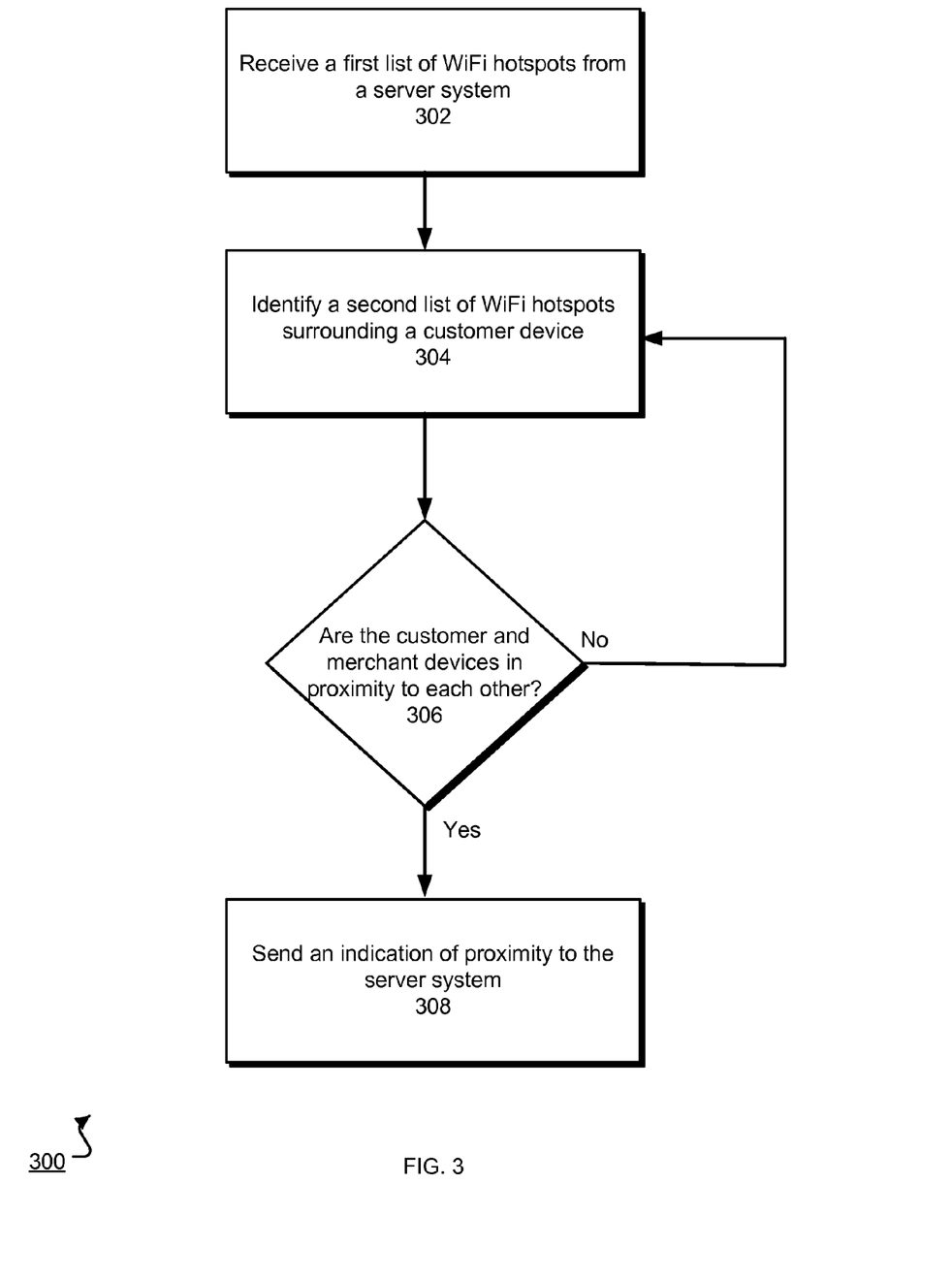
FIG. 3 is a diagram of an example flow chart of the customer device determining whether it is in proximity to the merchant device.

FIG. 3 is a diagram of an example flow chart 300 of the customer device determining whether it is in proximity to the merchant device. The customer device receives first hotspot identification data (or "identification data") identifying a first list of WiFi hotspots (or "wireless access points (WAPs)") from the server system (step 302). The hotspot identification data identifies represents WiFi hotspots that surround the merchant device, e.g., are able to be detected by a WiFi detector in the merchant device. In some implementations, the hotspot identification data is received simply as the first list of WiFi hotspots, i.e., the names and/or MAC addresses. In some implementations, the hotspot identification data is received as a hash value of the first list of WiFi hotspots. The customer device can store the received hash value. This allows the customer device to determine proximity without engaging in another network call with the server system.

The customer device identifies second hotspot identification data that indicates a second list of WiFi hotspots that surround the customer device (step 304), e.g., using a WiFi detector. In some implementations, the customer device hashes the second list of WiFi hotspots into a hash value. The customer device can identify the second list of WiFi hotspots in periodic intervals, e.g., every 2 to 10 minutes.

The customer device can keep track of one or more previous hash values and/or one or more previous lists of WiFi hotspots. If the customer device has not yet determined it is in proximity to the merchant device, the customer device can compare the second list of WiFi hotspots to a previously identified list of WiFi hotspots. The lists can be represented as hash values or as unmodified lists. If the lists of WiFi hotspots are identical, e.g., the surrounding WiFi hotspots around the customer device have not changed, the customer device can presume it has not significantly moved from its previous position. Therefore, the customer device would not have come in proximity to the merchant device. The customer device then can wait to identify WiFi hotspots at a next interval, thereby saving battery.

If the second list of WiFi hotspots has changed, the customer device determines whether the customer device is in proximity to the merchant device (step 306). The customer device compares the second list of WiFi hotspots to the received first list of WiFi hotspots. If the lists of WiFi hotspots are substantially equivalent, e.g., as unmodified lists or as hash values, the customer device determines it is in proximity to the merchant device. An example is further described below in reference to FIGS. 4A-4B. In some implementations, the customer device determines it is in proximity to the merchant device if a partial set of hotspots within the list of WiFi hotspots match.

In some implementations, the comparison between the first and second lists of WiFi hotspots occurs on the server system. Therefore, instead of receiving the first list of WiFi hotspots, the customer device sends the second list of WiFi hotspots, e.g., through a network call, to the server system, e.g., as a hash value. In some implementations, the second list of WiFi hotspots is sent to the server system only if the list is different from a previously identified list of WiFi hotspots. The server system can perform the comparison to determine whether the customer device is in proximity to the customer device. However, comparison on the server system requires more network calls from the customer device and thereby causes the customer device to use more battery.

If the customer device determines it is in proximity to the merchant device, the customer device can send an indication of proximity to the server system (step 308). The server system can receive the indication and notify the merchant device of the customer device's proximity. In some implementations, the server system determines the customer device is in proximity to the merchant device and the server system sends the indication of proximity to any one of the devices, as appropriate. The server system can send, to the merchant device, data associated with the customer device. The data can be personal identifying information of the customer, e.g., a name or picture. In some implementations, the server system sends the data after 1) determining proximity and 2) receiving indication of consent from the customer device to enter into a cardless transaction. The merchant device can process the personal identifying information, e.g., by displaying the customer information on a touchscreen of the merchant device. If the merchant conducts a transaction with the customer, the merchant device can send transaction information, e.g., payment amount and/or merchant information, to the server system. The server system can submit the transaction to a financial service for authorization.

Figure 4A:
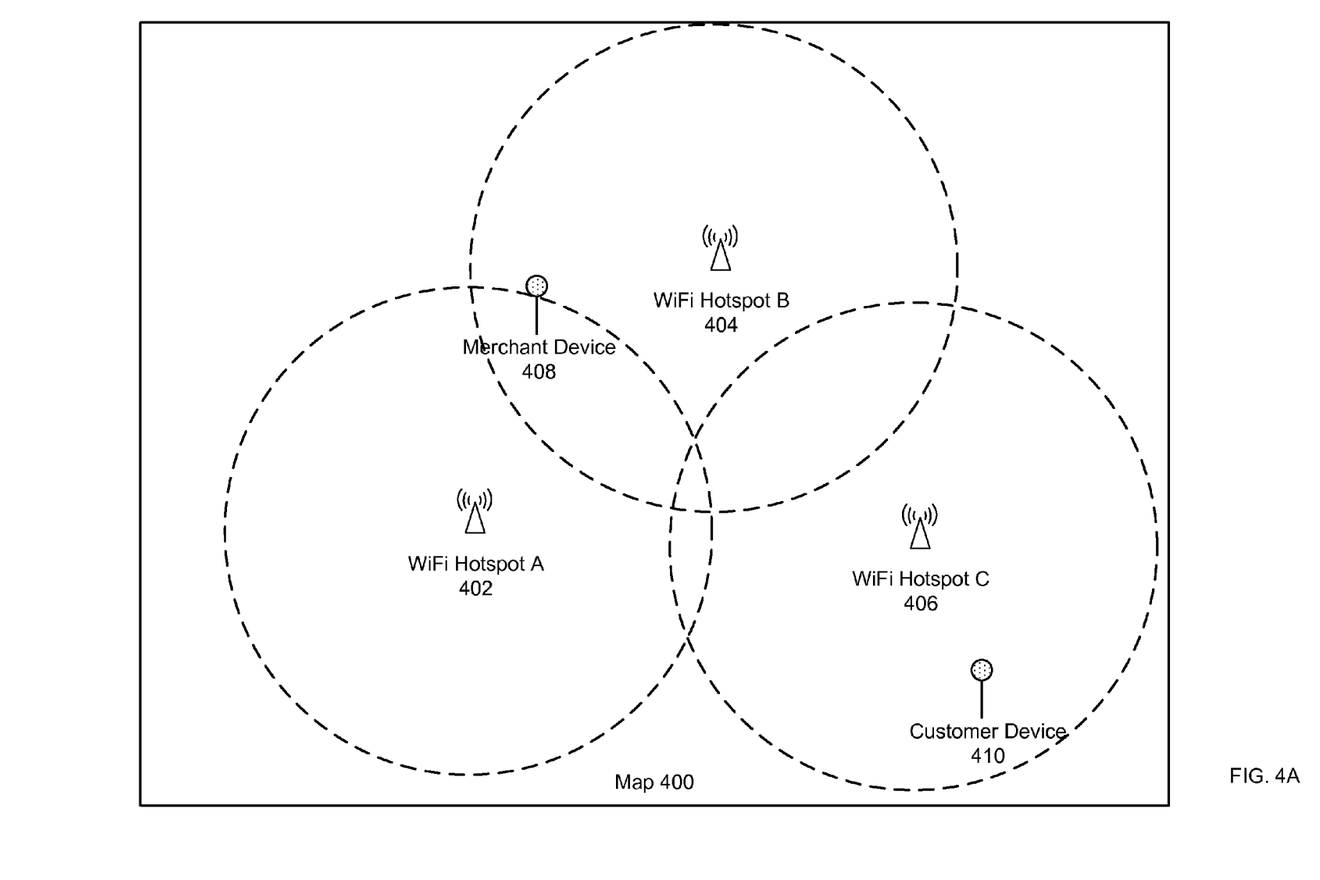
FIGS. 4A-B are diagrams of example maps of mobile devices that are and are not in proximity to each other.

FIG. 4A is a diagram of an example map 400 of a merchant device 408 and a customer device 410 that are not in proximity to each other. Merchant device 408 identifies a list of surrounding WiFi hotspots: WiFi Hotspot A 402 and WiFi hotspot B 404. Merchant device 408 can create a hash value of the list of surrounding WiFi hotspots, e.g., "A1B1." The merchant device 408 can send the hash value to a server system.

Customer device 410 receives the list of WiFi hotspots surrounding merchant device 408 in hash value form. For example, customer device 410 receives "A1B1" from the server system. The customer device 410 can store the received hash value for future comparisons. The customer device 410 identifies a list of surrounding WiFi hotspots: WiFi hotspot C 406. The customer device generates a hash from this list, e.g., "C1." The customer device can compare the two hashes and determine that "A1B1" is not equivalent to "C1." Therefore, the customer device can wait for a next interval at which it will repeat this process.

Figure 4B:
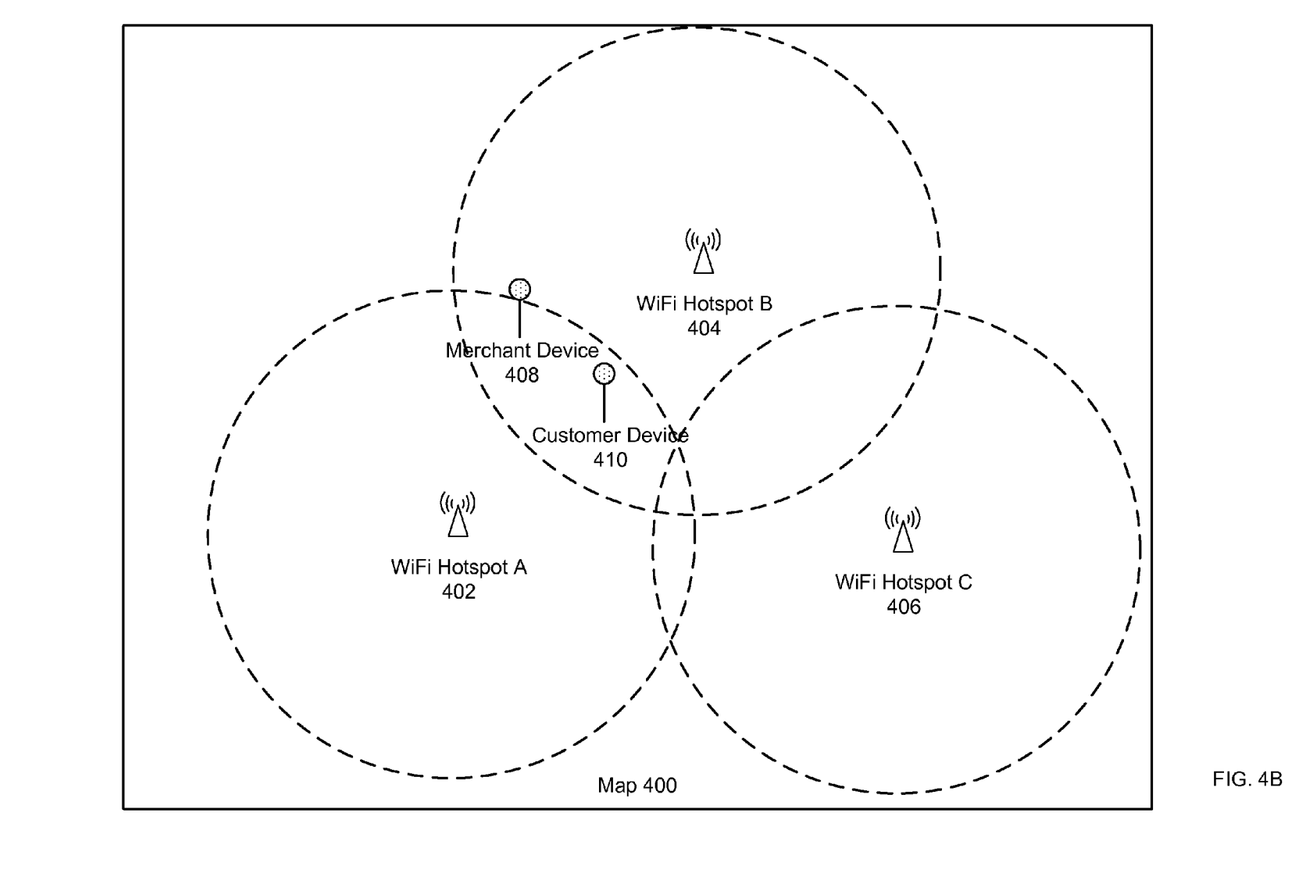

FIG. 4B is a diagram of an example map of the merchant device and the customer device that are in proximity to each other. Following from the example described in reference to FIG. 4A, the customer device 410 has moved closer to the merchant device 408. After an interval of time, customer device 410 identifies a list of surrounding WiFi hotspots: WiFi Hotspot A 402 and WiFi hotspot B 402, 404. The customer device generates a hash from this list: "A1B1." The previous hash value of surrounding WiFi hotspots is "C1." Because these hash values are different, the customer device 410 proceeds to determine whether it is in proximity to the merchant device 408, e.g., by retrieving the received hash value. In particular, the customer device 410 compares this hash value, e.g., "A1B1", to the received hash value, e.g., "A1B1." The customer device 410 determines these hash values are equivalent and can send an indication of proximity to the server system.

In some implementations, instead of determining equivalence of hash values, the customer device 410 sends the indication of proximity if surrounding WiFi hotspots overlap. That is, the indication of proximity can be sent if the list of surrounding WiFi hotspots around the customer device 410 includes one or more WiFi hotspots in common with the list of surrounding WiFi hotspots around the merchant device 408.

Although the discussion above has focused on the first device as a merchant device and the second device as a customer device, the technique described above can be used to detect the proximity of mobile devices of other types of users, and for other applications. For example, both the first and second devices can both be personal user devices, and the proximity determination can be provided to a social networking application on the second user's mobile device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of determining, at a server system, proximity between a first device and a second device, the server system including memory for storing instructions and at least one processor for executing the instructions to perform the method of determining, the method of determining comprising:

receiving identification data from the first device, where the identification data identifies a plurality of wireless access points that are in proximity to the first device;
   determining that the second device is associated with the first device;
   sending at least a portion of the identification data to the second device, where the first device and second device are mobile devices;
   receiving an indication of proximity from the second device; and
   notifying the first device of the indication of proximity.

2. The method of claim 1, where the at least the portion of the identification data comprises a hash value of at least one of MAC addresses or names of the plurality of wireless access points.

3. The method of claim 1, where the at least the portion of the identification data comprises a list of at least one of MAC addresses or names of the plurality of wireless access points.

4. The method of claim 1, where the notifying includes sending, to the first device, the indication of proximity of the second device and data associated with the second device.

5. The method of claim 4, where the data associated with the second device includes personal identifying information of a user of the second device.

6. The method of claim 1, further comprising:
   receiving, from the first device, data indicating a payment transaction between the first device and the second device; and
   submitting the payment transaction to a financial service for authorization.

7. The method of claim 1, where the determining comprises determining that the second device has given an indication of consent to interact with the first device.

8. The method of claim 1, where the first device is a customer device, and the second device is a merchant device, further comprising:
   prior to sending the at least a portion of the identification data to the second device, determining that the customer device has given an indication of consent to perform a cardless payment transaction with the merchant device.

9. A computer program product encoded on a non-transitory computer storage medium operable on a computing device including at least one data processing apparatus that executes the stored computer program product to cause the at least one data processing apparatus to perform operations comprising:
   receiving identification data from a first device, where the identification data identifies a plurality of wireless access points that are in proximity to the first device;
   determining that a second device is associated with the first device;
   sending at least a portion of the identification data to the second device, where the first device and second device are mobile devices;
   receiving an indication of proximity from the second device; and
   notifying the first device of the indication of proximity.

10. The computer program product of claim 9, where the at least the portion of the identification data comprises a hash value of at least one of MAC addresses or names of the plurality of wireless access points.

11. The computer program product of claim 9, where the at least the portion of the identification data comprises a list of the at least one of MAC addresses or names of the plurality of wireless access points.

12. The computer program product of claim 9, where the notifying includes sending, to the first device, the indication of proximity of the second device and data associated with the second device.

13. The computer program product of claim 12, where the data associated with the second device includes personal identifying information of a user of the second device.

14. The computer program product of claim 9, further comprising:
   receiving, from the first device, data indicating a payment transaction between the first device and the second device; and
   submitting the payment transaction to a financial service for authorization.

15. The computer program product of claim 9, where the determining comprises determining that the second device has given an indication of consent to interact with the first device.

16. The computer program product of claim 9, where the first device is a customer device, and the second device is a merchant device, further comprising:
   prior to sending the at least the portion of the identification data to the second device, determining that the customer device has given an indication of consent to perform a cardless payment transaction with the merchant device.

17. A system comprising one or more computers, each of the one or more computers including a memory for storing instructions and at least one processor for executing the instructions to perform operations comprising:
   receiving identification data from a first device, where the identification data identifies a plurality of wireless access points that are in proximity to the first device;
   determining that a second device is associated with the first device;
   sending at least a portion of the identification data to the second device, where the first device and second device are mobile devices;
   receiving an indication of proximity from the second device; and
   notifying the first device of the indication of proximity.

18. The system of claim 17, where the at least the portion of the identification data comprises a hash value of at least one of MAC addresses or names of the plurality of wireless access points.

19. The system of claim 17, where the at least the portion of the identification data comprises a list of at least one of MAC addresses or names of the plurality of wireless access points.

20. The system of claim 17, where the notifying includes sending, to the first device, the indication of proximity of the second device and data associated with the second device.

21. The system of claim 20, where the data associated with the second device includes personal identifying information of a user of the second device.

22. The system of claim 17, further comprising:
   receiving, from the first device, data indicating a payment transaction between the first device and the second device; and
   submitting the payment transaction to a financial service for authorization.

23. The system of claim 17, where the determining comprises determining that the second device has given an indication of consent to interact with the first device.

24. The system of claim 17, where the first device is a customer device, and the second device is a merchant device, further comprising:
   prior to sending the at least the portion of the identification data to the second device, determining that the customer device has given an indication of consent to perform a cardless payment transaction with the merchant device.

* * * * *